Jan. 14, 1936.    L. M. CURRIE    2,027,961
ARTICLE COMPRISING PLASTIC COMPOSITIONS AND PROCESS OF MAKING THE SAME
Filed March 3, 1933
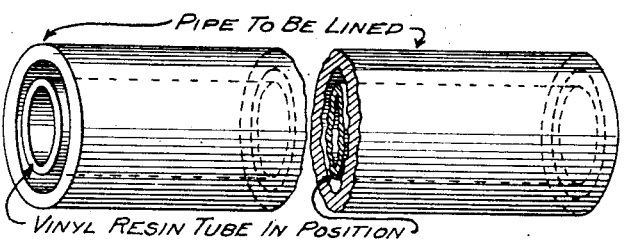
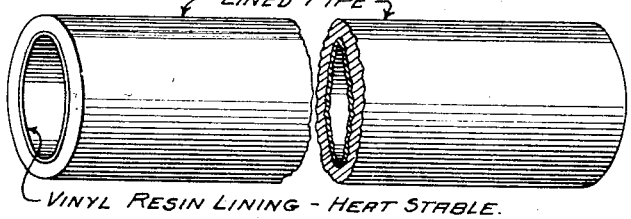
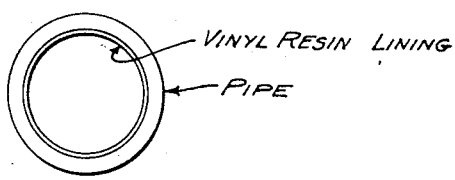
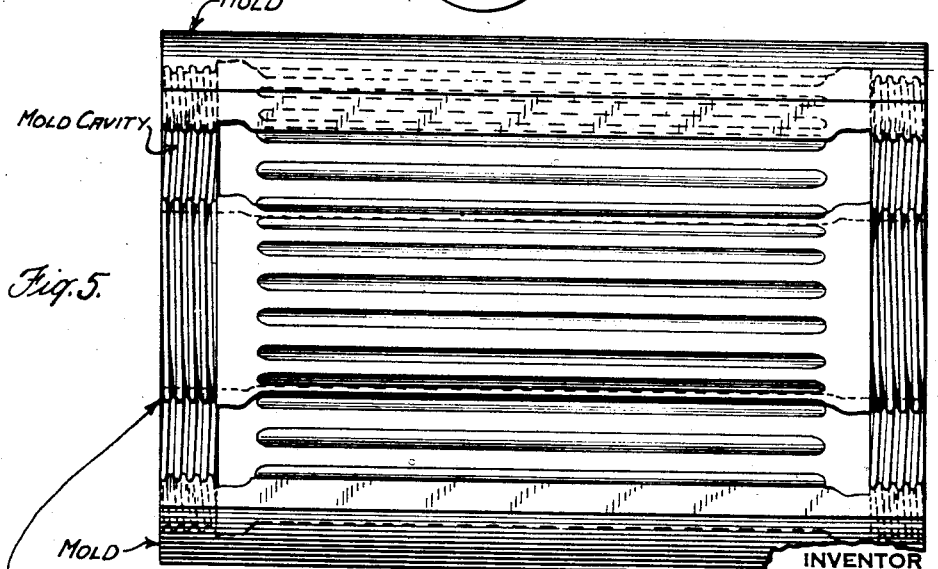
INVENTOR
LAUCHLIN M. CURRIE
BY
ATTORNEY Patented Jan. 14, 1936

2,027,961

UNITED STATES PATENT OFFICE 2,027,961

ARTICLE COMPRISING PLASTIC COMPOSITIONS AND PROCESS OF MAKING THE SAME

Lauchlin M. Currie, Lakewood, Ohio, assignor to National Carbon Company, Inc., Cleveland, Ohio Application March 3, 1933, Serial No. 659,457

17 Claims. (Cl. 18—59)

This invention relates to the production of articles composed wholly or in part of plastic materials which contain vinyl resins. The invention also includes novel articles which may be produced by the new methods. Throughout this specification and the claims the term vinyl resin will be understood to designate those artificial resinous products which may be made by the polymerization of vinyl esters, mixtures of vinyl esters and mixtures containing vinyl esters and vinyl benzene.

An object of the invention is to provide novel methods for making articles composed at least in part of plastic materials containing vinyl resins. Another object is to provide new and useful articles formed at least in part from vinyl resin compositions. Another object is to provide novel methods for forming articles comprising vinyl resin compositions which include the step of extruding the vinyl resin composition. A further object is to provide novel methods for securing vinyl resin plastic portions to other materials to form new composite articles. Other objects of the invention will be apparent from the description to follow.

In the drawing, Fig. 1 shows a tube of vinyl resin useful in practicing the invention;

Fig. 2 shows the tube of Fig. 1 in position for forming a composite article embodying the invention;

Fig. 3 is a composite hollow article embodying the invention;

Fig. 4 is an end view of the composite hollow article in Fig. 3; and

Fig. 5 shows the formation of a hollow article according to another embodiment of the invention.

Vinyl resins of various types are known and represent a diversity of artificial resins having varied characteristics. Polymerization products of vinyl esters of organic acids, particularly those of the lower fatty acids, such as vinyl acetate, propionate and butyrate, are generally fusible at relatively low temperatures, soluble in common organic solvents, such as benzene, alcohol and toluene, and are soft and adhesive in nature. Products resulting from the polymerization of vinyl esters of inorganic acids, especially the vinyl halides, are less readily fusible and soluble, harder, more brittle and much less adhesive than polymerized vinyl esters of organic acids. Polymerized vinyl benzene (styrene) resembles the polymerized vinyl halides with respect to the properties mentioned.

Vinyl resins made by the conjoint polymerization (by which is meant polymerization while in mutual contact) of a plurality of vinyl compounds differ greatly from mixtures of separately polymerized vinyl compounds and from the individual polymers. Vinyl resins such as those resulting from the conjoint polymerization of vinyl compounds of the groups mentioned above are preferred for use in accordance with this invention. Of the resinous products which may be made by the conjoint polymerization of vinyl compounds, products which are especially desirable are those which may be formed by conjointly polymerizing vinyl halides with vinyl esters of the lower fatty acids in the proportions of about 70% to about 95% of vinyl halide, and of these latter products, those which may be made from vinyl chloride are preferred.

The preferred vinyl resins may be made by processes which form no part of this invention. A particularly desirable process for making these resins includes conducting the polymerization of the vinyl compounds at a temperature below 60° C. and preferably below about 40° C. If liquid media are present during the polymerization they should be selected from those liquids which are nonsolvents or poor solvents for the resin formed and the amount of the liquid medium should be small. Catalysts such as organic peroxides are satisfactory for promoting the polymerization.

The various vinyl resins discussed above may be modified as desired in forming the compositions with which this invention is concerned. For example, it is usually desirable to incorporate materials in the compositions to insure chemical stability of the resin. For this purpose basic materials are preferred, for example, calcium stearate made alkaline with hydrated lime or other alkaline earth metal soaps and metallic soaps in general are useful. The compositions may include filling materials both mineral and cellulosic in nature, as typified by cotton flock, alpha pulp, wood flour, silica, mica, talc, asbestos, slate flour and the like. Many of the vinyl resins are colorless or nearly so, hence they may be colored with pigments, lakes or dyes to produce any desired shade of color, and they may be made transparent, translucent or opaque.

The processes of this invention may include extrusion of the vinyl resin composition and for this reason it is especially desirable to incorporate lubricants in the mixture to be extruded. Examples of suitable lubricants are waxes, such as carnauba wax, candelilla wax, ceresin wax, halogenated diphenyl, and halogenated naphthalenes. These lubricants may be used in amounts not exceeding 10% by weight of the total composition, and preferably about 3% is included. In general, waxes or wax-like materials which soften and have lubricating properties at high temperatures and which are chemically inert toward viny-resins are suitable.

The new method provided by this invention makes possible the production of hollow articles composed wholly or in part of vinyl resin compositions. In general, the method comprises making a hollow preform of the vinyl resin portion of the article to be produced and subjecting this preform to fluid pressure applied internally thereto while the preform is heated and confined within a matrix whose interior defines the form in which the vinyl resin portion is desired. After the vinyl resin composition assumes the form desired, it is additionally subjected to heat while the pressure is maintained thereon until it will remain in that form when heated after the pressure is released. Pneumatic pressure, such as that obtainable by the use of compressed air is preferred, but the pressure may be applied through any fluid, which will not attack the vinyl resin. In general, pressures up to about 80 pounds per square inch may be used, and about 5 to 10 pounds per square inch is usually sufficient. It is apparent that the matrix may be a part of the finished article which is to be provided with a lining of the vinyl resin composition, at least in part, or it may be a mold which is removed after the process of shaping the vinyl resin composition has been performed. Less pressure is, of course, required according to the extent to which the vinyl resin portion is heated during the application of pressure, but in any event it must be heated after it has been given the form and shape desired to insure its remaining in the form desired if it is heated after the pressure is released. When this latter condition prevails the vinyl resin is said to be heat stable.

The expression heat stable is used to describe that condition of the vinyl resin or vinyl resin composition in which all of its internal elastic forces are released and are in equilibrium. In this condition the vinyl resin will not alter its physical form upon the application of heat until its plasticity becomes so great as to approach fluidity and thus allow the resin to distort by pure flow. Opposed to this condition is that condition which is termed heat unstable and which expresses the condition of the resin or composition in which the elastic forces are not all released and are merely held in the material because of its rigidity at temperatures below its heat distortion point. From this heat unstable condition the resin will, upon the application of heat above its heat distortion point, tend to change irreversibly and automatically in physical form or shape into that form or shape in which it last existed in a heat stable condition. In this connection heat stable and unstable have no reference to the chemical stability of the material, but express the state of purely physical forces within the resin mass.

The heat distortion point referred to above is that determined by the usual A. S. T. M. method for testing thermoplastic materials, and the test is applied to the pure resin. The heat distortion point for those vinyl resins preferred for use in this invention may vary from about 60° to about 70° C.

Vinyl resins may be converted from a heat unstable to a heat stable condition by the application of heat in practically any degree. At temperatures below the heat distortion point, the heat must be applied over a long period of time, and the time required to effect the change varies inversely with the temperature. The upper temperature limit is that approaching the point at which decomposition of the resin becomes imminent, or about 140° C.

The resin compositions which may be used in this invention may include filling materials up to about 50% by volume of the total, but the elastic properties of the composition which are herein utilized vary directly with the percentage of resin in the composition and are more pronounced in those materials containing a large proportion of the vinyl resin. Compositions containing upwards of 75% of the vinyl resin are preferred. The chemical stabilizing addition may be present in relatively small amounts; from 1% to 3%, based on the weight of the resin, of alkaline calcium stearate or equivalent material is preferred. The lubricant, which is essential to obtain smooth surfaced extruded preforms, may be present in amounts not exceeding 10% by weight of the resin, and about 3% by weight is preferred.

Where extrusion methods are used in practicing the invention, temperatures and pressures in the extrusion device may vary widely. In general, temperatures of from 110° to 140° C. may be used and pressures of 1,000 to 10,000 pounds per square inch.

The finished articles may be self-glossed or finished by dipping them in a solvent for the vinyl resin which imparts a lacquer-like polish to the surface after the solvent has been removed by drying. Suitable solvents for this self-lacquering operation are ketones, such as acetone, ethyl methyl ketone, and methyl isobutyl ketone, halogenated hydrocarbons, such as chlorobenzene, propylene and ethylene dichlorides or dibromides and acetylene tetrachloride, and esters, such as ethyl acetate, butyl acetate and the like.

The invention will be illustrated by the following specific examples.

*Example 1*

A vinyl resin was prepared by conjointly polymerizing vinyl acetate and vinyl chloride in the proportions of about 80% by weight of vinyl chloride. The polymerization was conducted in the presence of acetone as a liquid medium and about 1% by weight of dibenzoyl peroxide as a catalyst at a temperature of about 30° C.

The resulting resin, after unpolymerized material and catalytic residues were removed, was compounded with about 3% by weight of carnauba wax and about 2% by weight of alkaline calcium stearate.

This composition was charged into an internal pressure mixer heated by a steam jacket and agitated until it was heated throughout to about 125° C. It was then charged into the extrusion device where it was extruded under a pressure of 2,500 pounds per square inch through a die which consisted of an annular opening 0.0375 inch in width having an internal diameter of 0.75 inch. The tube so produced expanded upon extrusion to an approximate external diameter of 1.0 inch, and while hot was placed within a length of 1¼ inch standard iron pipe. Compressed air was supplied to one end of the tube within the pipe and the other end was closed. A pressure of about 5 to 10 pounds per square inch was attained and the tube was forced tightly against the interior of the pipe to form a lining. The pressure was maintained and the tube was heated to a temperature of about 110° C. for about 15 minutes to insure the transition of the vinyl resin composition through the heat unstable condition into a heat stable condition.

The pipe so lined is completely protected from the corrosive action of fluids which may be conducted therethrough. The vinyl resin composition is inert chemically and is unaffected by water, acids, alkalies and many other corrosive substances which deleteriously affect ordinary iron pipe.

If the transition to the heat stable condition is not completed, the lining will tend to loosen from the pipe when its temperature is raised. For example, if the pipe is cooled and the pressure released as soon as the vinyl resin tube has been expanded to form the lining, a lined pipe which appears to be identical with that produced by the process described is obtained. However, if this lined pipe is again heated the vinyl resin lining will separate from the pipe and return to its size before expanding. For this reason it is essential to continue to apply heat while the tube is under the expanding pressure until it becomes heat stable.

By the process described, linings of vinyl resin compositions may be readily secured within hollow articles of any shape for insulative, protective or decorative purposes.

*Example 2*

A vinyl resin composition as described in Example 1 was prepared and extruded in the same manner to form a tube 0.75 inch internal diameter having a wall thickness of 0.375 inch. This tube was placed within a two piece mold which was in the form of the barrel of a cylindrical flashlight case. About 5 to 10 pounds per square inch of air pressure was applied to the inside of the tube and it was expanded against the mold. The pressure was maintained and the mold was heated to about 110° C. for 15 minutes and thereafter cooled and opened. The casting was strong, heat stable and formed an excellent insulated flashlight case.

The process may be used to form hollow objects of all kinds, such as toys, vases, containers, electrical parts and the like. This method permits the use of molds of simple and economical construction and eliminates the use of high pressures, such as are usually required for hot molding plastic materials.

I claim:—

1. Method of making hollow articles having at least a portion thereof composed of a vinyl resin composition which comprises making a hollow preform of a vinyl resin composition, placing said preform within a matrix the interior of which defines the form of said vinyl resin portion of said article, subjecting said preform while heated to fluid pressure applied internally thereto until it assumes the form of said matrix and thereafter maintaining said pressure and subjecting the vinyl resin portion to heat to make it heat stable.

2. Method of making hollow articles having at least a portion thereof composed of a vinyl resin composition which comprises making a hollow preform of a composition containing a predominating proportion of a vinyl resin identical with a resin resulting from the conjoint polymerization of at least two compounds of the group consisting of vinyl halides, vinyl esters of lower fatty acids and vinyl benzene, placing said preform within a matrix the interior of which defines the form of said vinyl resin portion of said article, subjecting said preform while heated to fluid pressure applied internally thereto until it assumes the form of said matrix, and thereafter maintaining said pressure and subjecting the vinyl resin portion to heat to make it heat stable.

3. Method of making hollow articles having at least a portion thereof composed of a vinyl resin composition which comprises making a hollow preform of a composition containing a predominating proportion of a vinyl resin identical with a resin resulting from the conjoint polymerization of a vinyl halide and a vinyl ester of a lower fatty acid in the proportions of about 70% to about 95% of the vinyl halide, placing said preform within a matrix the interior of which defines the form of said vinyl resin portion of said article, subjecting said preform while heated to fluid pressure applied internally thereto until it assumes the form of said matrix, and thereafter maintaining said pressure and subjecting the vinyl resin portion to heat to make it heat stable.

4. Method of making hollow articles having at least a portion thereof composed of a vinyl resin composition which comprises making a hollow preform of a composition containing a predominating proportion of a vinyl resin identical with a resin resulting from the conjoint polymerization of vinyl chloride and vinyl acetate in the proportions of about 70% to about 95% of vinyl chloride, placing said preform within a matrix the interior of which defines the form of said vinyl resin portion of said article, subjecting said preform while heated to fluid pressure applied internally thereto until it assumes the form of said matrix, and thereafter maintaining said pressure and subjecting the vinyl resin portion to heat to make it heat stable.

5. Method of making hollow articles having at least a portion thereof composed of a vinyl resin composition which comprises making a hollow preform of a composition containing a predominating proportion of a vinyl resin identical with a resin resulting from the conjoint polymerization of vinyl chloride and vinyl acetate in the proportions of about 70% to about 95% of vinyl chloride together with up to about 10% of a waxlike lubricant, placing said preform within a matrix the interior of which defines the form of said vinyl resin portion of said article, subjecting said preform while heated to fluid pressure applied internally thereto until it assumes the form of said matrix, and thereafter maintaining said pressure and subjecting the vinyl resin portion to heat to make it heat stable.

6. Method of making hollow articles having at least a portion thereof composed of a vinyl resin composition which comprises making a hollow preform of a composition containing a predominating proportion of a vinyl resin identical with a resin resulting from the conjoint polymerization of vinyl chloride and vinyl acetate in the proportions of about 70% to about 95% of vinyl chloride together with up to about 10% of a waxlike lubricant and a basic stabilizing material, placing said preform within a matrix the interior of which defines the form of said vinyl resin portion of said article, subjecting said preform while heated to fluid pressure applied internally thereto until it assumes the form of said matrix, and thereafter maintaining said pressure and subjecting the vinyl resin portion to heat to make it heat stable.

7. Method of making composite hollow articles having an inner portion composed of a composition containing a predominating proportion of a vinyl resin identical with a resin resulting from the conjoint polymerization of at least two compounds of the group consisting of vinyl halides, vinyl esters of lower fatty acids and vinyl benzene, which comprises forming a hollow preform of the vinyl resin portion of said article, placing said preform within the outer portion of said article, subjecting said preform while heated to fluid pressure applied internally thereto until it assumes the form of said vinyl resin portion of said article, and thereafter maintaining said pressure and subjecting the vinyl resin portion to heat to make it heat stable.

8. Method of making composite hollow articles having an inner portion composed of a composition containing a predominating proportion of a vinyl resin identical with a resin resulting from the conjoint polymerization of vinyl chloride and vinyl acetate in the proportions of about 70% to about 95% of vinyl chloride, which comprises forming a hollow preform of the vinyl resin portion of said article, placing said preform within the outer portion of said article, subjecting said preform while heated to fluid pressure applied internally thereto until it assumes the form of said vinyl resin portion of said article, and thereafter maintaining said pressure and subjecting the vinyl resin portion to heat to make it heat stable.

9. Method of making hollow articles composed of a composition containing a predominating proportion of a vinyl resin identical with a resin resulting from the conjoint polymerization of at least two compounds from the group consisting of vinyl halides, vinyl esters of lower fatty acids and vinyl benzene, which comprises forming a hollow preform of said article, placing said preform within a matrix, subjecting said preform while heated to fluid pressure applied internally thereto until it assumes the form defined by the interior of said matrix, maintaining said pressure and subjecting the vinyl resin composition to heat to make it heat stable, and thereafter removing said article from said matrix.

10. Method of making hollow articles composed of a composition containing a predominating proportion of a vinyl resin identical with a resin resulting from the conjoint polymerization of vinyl chloride and vinyl acetate in the proportions of about 70% to about 95% of vinyl chloride, which comprises forming a hollow preform of said article, placing said preform within a matrix, subjecting said preform while heated to fluid pressure applied internally until it assumes the form defined by the interior of said matrix, maintaining said pressure and subjecting the vinyl resin composition to heat to make it heat stable, and thereafter removing said article from said matrix.

11. Composite hollow article comprising an inner portion composed of a vinyl resin composition in surface contact with and closely adherent to an outer portion formed of another material, said vinyl resin portion being in a heat stable condition and formed continuously throughout its extent.

12. Composite hollow article comprising an inner portion composed of a composition containing a predominating proportion of a vinyl resin identical with a resin resulting from the conjoint polymerization of at least compounds from the group consisting of vinyl halides, vinyl esters of lower fatty acids and vinyl benzene, said inner portion being in surface contact with and closely adherent to an outer portion of another material, and said vinyl resin portion being in a heat stable condition and formed continuously throughout its extent.

13. Composite hollow article comprising an inner portion composed of a composition containing a predominating proportion of a vinyl resin identical with a resin resulting from the conjoint polymerization of a vinyl halide and a vinyl ester of a lower fatty acid in the proportions of about 70% to about 95% of the vinyl halide, said inner portion being in surface contact with and closely adherent to an outer portion of another material, and said vinyl resin portion being in a heat stable condition and formed continuously throughout its extent.

14. Composite hollow article comprising an inner portion composed of a composition containing a predominating proportion of a vinyl resin identical with a resin resulting from the conjoint polymerization of vinyl chloride and vinyl acetate in the proportions of about 70% to about 95% of vinyl chloride, said inner portion being in surface contact with and closely adherent to an outer portion of another material, and said vinyl resin portion being in a heat stable condition and formed continuously throughout its extent.

15. Composite hollow article comprising an inner portion composed of a composition containing a predominating proportion of a vinyl resin identical with a resin resulting from the conjoint polymerization of vinyl chloride and vinyl acetate in the proportions of about 70% to about 95% of vinyl chloride together with up to about 10% of a wax-like lubricant, said inner portion being in surface contact with and closely adherent to an outer portion of another material, and said vinyl resin portion being in a heat stable condition and formed continuously throughout its extent.

16. Composite hollow article comprising an inner portion composed of a composition containing a predominating proportion of a vinyl resin identical with a resin resulting from the conjoint polymerization of vinyl chloride and vinyl acetate in the proportions of about 70% to about 95% of vinyl chloride together with up to about 10% of a wax-like lubricant and a basic stabilizing material, said inner portion being in surface contact with and closely adherent to an outer portion of another material, and said vinyl resin portion being in a heat stable condition and formed continuously throughout its extent.

17. Chemically resistant composite pipe comprising an inner lining composed of a vinyl resin composition in surface contact with and closely adherent to a metallic pipe surrounding said lining, said vinyl resin lining being in a heat stable condition and formed continuously throughout its extent.

LAUCHLIN M. CURRIE.